United States Patent [19]

Bryant et al.

[11] Patent Number: 4,604,221

[45] Date of Patent: Aug. 5, 1986

[54] NITROGEN-CONTAINING ESTERS AND LUBRICANTS CONTAINING THEM

[75] Inventors: Charles P. Bryant, Euclid; Harold M. Gerdes, Cleveland, both of Ohio

[73] Assignee: The Lubrizol Corporation, Wickliffe, Ohio

[21] Appl. No.: 718,837

[22] Filed: Apr. 3, 1985

Related U.S. Application Data

[63] Continuation of Ser. No. 395,786, Jul. 6, 1982, abandoned.

[51] Int. Cl.$^4$ .......................................... C16M 145/00
[52] U.S. Cl. .......................... 252/51.5 A; 525/327.4; 525/327.7; 525/329.5; 525/330.5
[58] Field of Search ............... 252/51.5 A; 525/327.4, 525/327.7, 327.8, 329.5, 330.5

[56] References Cited

U.S. PATENT DOCUMENTS

| | | | |
|---|---|---|---|
| 2,286,062 | 6/1942 | Condo et al. | 260/32 |
| 2,342,113 | 2/1944 | Blair | 252/56 |
| 2,359,103 | 9/1944 | Gerhart et al. | 260/36 |
| 2,366,517 | 1/1945 | Gleason | 252/56 |
| 2,451,370 | 10/1948 | Alderson | 260/78 |
| 2,454,284 | 11/1948 | Kirk | 260/23 |
| 2,469,408 | 5/1949 | Powers et al. | 117/145 |
| 2,490,489 | 12/1949 | Tauch | 260/78.5 |
| 2,519,764 | 8/1950 | Jacobson | 154/43 |
| 2,537,020 | 1/1951 | Barrett | 260/78.5 |
| 2,561,313 | 7/1951 | Malinowski | 260/23 |
| 2,570,788 | 10/1951 | Giammaria | 260/485 |
| 2,570,846 | 10/1951 | Otto et al. | 252/56 |
| 2,600,422 | 6/1952 | Neher et al. | 260/78.5 |
| 2,600,449 | 6/1952 | Van Horne et al. | 260/78.5 |
| 2,606,891 | 8/1952 | Rowland | 260/78.5 |
| 2,607,762 | 8/1952 | Bowen | 260/78.5 |
| 2,615,845 | 10/1952 | Lippincott et al. | 252/56 |
| 2,615,864 | 10/1952 | Giammaria | 260/78.5 |
| 2,628,198 | 2/1953 | Arundale et al. | 252/56 |
| 2,628,220 | 2/1953 | Arundale et al. | 260/78.5 |
| 2,642,414 | 6/1953 | Bauer et al. | 260/78.5 |
| 2,647,886 | 8/1953 | Seymour | 260/78.5 |
| 2,676,934 | 4/1954 | Butler | 260/28.5 |
| 2,691,609 | 10/1954 | Snyder | 154/43 |
| 2,710,283 | 6/1955 | Linsk | 252/57 |
| 2,721,878 | 10/1955 | Popkin | 260/485 |
| 2,798,062 | 7/1957 | Contois | 260/78.5 |
| 2,872,436 | 2/1959 | Hibbard | 260/78.5 |
| 2,876,213 | 3/1959 | Bartlett et al. | 260/78.5 |
| 2,906,729 | 9/1959 | Popkin | 260/45.9 |
| 2,977,334 | 3/1961 | Zopf et al. | 260/27 |
| 2,988,539 | 6/1961 | Cohen et al. | 260/78 |
| 2,992,987 | 7/1961 | Fields | 252/56 |
| 3,002,954 | 10/1961 | Sellers | 260/78.5 |
| 3,030,342 | 4/1962 | Tiefenthal et al. | 260/78.5 |
| 3,041,315 | 6/1962 | Gerlich et al. | 260/78 |
| 3,069,245 | 12/1962 | Wythe et al. | 44/62 |
| 3,085,994 | 4/1963 | Muskat | 260/78.5 |
| 3,178,395 | 4/1965 | Muskat | 260/78.5 |
| 3,184,309 | 5/1965 | Minsk et al. | 96/29 |
| 3,222,282 | 12/1965 | Berkowitz | 252/51.5 |
| 3,297,657 | 1/1967 | Gray et al. | 260/78.5 |
| 3,329,658 | 7/1967 | Fields | 260/78.5 |
| 3,365,399 | 1/1968 | Verdol et al. | 252/51.5 |
| 3,392,155 | 7/1968 | Muskat | 260/78.5 |
| 3,404,135 | 10/1968 | Tietz | 260/78.5 |
| 3,423,355 | 1/1969 | Verdol et al. | 260/32.8 |
| 3,423,373 | 1/1969 | Verdol et al. | 260/78.5 |
| 3,449,250 | 6/1969 | Fields | 252/51.5 |
| 3,451,979 | 6/1969 | Muskat | 260/78.5 |
| 3,511,798 | 5/1970 | Isaacson | 260/29.6 |
| 3,536,461 | 10/1970 | Mueller et al. | 44/62 |
| 3,558,570 | 1/1971 | Rinno et al. | 260/78.5 |
| 3,558,743 | 1/1971 | Verdol et al. | 260/848 |
| 3,574,575 | 4/1971 | Gee et al. | 44/62 |
| 3,575,861 | 1/1971 | Pratt | 252/51.5 |
| 3,629,112 | 12/1971 | Gower et al. | 252/34.7 |
| 3,629,357 | 12/1971 | Sekmakas | 260/78.5 |
| 3,650,978 | 3/1972 | Chambers et al. | 252/356 |
| 3,651,029 | 3/1972 | Fujimoto et al. | 260/78.5 |
| 3,687,906 | 8/1972 | Hanson et al. | 260/78.5 T |
| 3,702,300 | 11/1972 | Coleman | 252/51.5 A |
| 3,732,332 | 5/1973 | Curtis et al. | 260/83.7 R |
| 3,741,943 | 6/1973 | Sekmakas | 260/78.5 T |
| 3,795,614 | 3/1974 | Fujimoto et al. | 252/51.5 A |
| 3,878,151 | 4/1975 | Dachs et al. | 260/29.6 T |
| 3,884,856 | 5/1975 | Motier et al. | 260/23 EP |
| 3,925,328 | 12/1975 | Shibahara et al. | 260/78.5 T |
| 3,933,761 | 1/1976 | Coleman | 260/78.5 T |
| 3,941,808 | 3/1976 | Pratt | 260/326.26 |
| 3,959,159 | 5/1976 | Coleman | 252/51.5 A |
| 3,983,095 | 9/1976 | Bashaw et al. | 526/15 |
| 4,145,375 | 3/1979 | Cutter et al. | 260/874 |
| 4,172,861 | 10/1979 | Lietal | 525/28 |
| 4,182,752 | 1/1980 | Maeda et al. | 424/78 |
| 4,221,886 | 9/1980 | Topfl | 525/329 |
| 4,284,414 | 8/1981 | Bryant | 44/62 |

FOREIGN PATENT DOCUMENTS

| | | |
|---|---|---|
| 2101282 | 7/1972 | Fed. Rep. of Germany. |
| 922878 | 4/1963 | United Kingdom. |
| 1172950 | 12/1969 | United Kingdom. |
| 1528992 | 10/1978 | United Kingdom. |

*Primary Examiner*—William R. Dixon, Jr.
*Assistant Examiner*—Cynthia A. Prezlock
*Attorney, Agent, or Firm*—James L. Cordek; Denis A. Polyn; Joseph P. Fischer

[57] ABSTRACT

A nitrogen-containing ester of a carboxy-containing interpolymer which is particularly useful as a pour point depressant is disclosed. The interpolymer has a reduced specific viscosity of from about 0.05 to about 1 and is derived from at least two monomers, one of said monomers being a low molecular weight aliphatic olefin or styrene and the other of said monomers being an alpha, beta-unsaturated aliphatic acid, anhydride or ester thereof. The nitrogen-containing ester is substantially free of titratable acidity and is characterized by the presence within its polymeric structure of at least one of each of the following groups which are derived from the carboxy groups of said interpolymer:

(A) a carboxylic ester group, said carboxylic ester group having at least eight aliphatic carbon atoms in the ester radical, and (B) a carbonyl-polyamino group derived from a polyamino compound having one primary or secondary amino group and at least one monofunctional amino group, wherein the molar ratio of carboxy groups of said interpolymer esterified to provide (A) to carboxy groups of said interpolymer neutralized to provide (B) is in the range of about 85:15 to about 99:1. Lubricant compositions and additive concentrates comprising the foregoing nitrogen-containing ester as well as a process for making such ester are also disclosed.

50 Claims, No Drawings

NITROGEN-CONTAINING ESTERS AND LUBRICANTS CONTAINING THEM

This is a continuation of co-pending application Ser. No. 395,786 filed on July 6, 1982, abandoned.

TECHNICAL FIELD

This invention relates to nitrogen-containing esters of carboxy-containing interpolymers and to lubricating compositions and additive concentrates containing such esters. More particularly, this invention relates to interpolymers derived from low molecular weight olefin or styrene and alpha, beta-unsaturated aliphatic acid, anhydride or ester thereof, such interpolymers being esterified with long chain aliphatic alcohols and neutralized with polyamino compounds having one primary or secondary amino group and at least one mono-functional amino group, the resulting nitrogen-containing esters being particularly useful as pour point depressants.

BACKGROUND OF THE INVENTION

Ever since lubricating oils were prepared from crude oils, refiners have experienced difficulty with congealation of these products at low temperatures. Part of the difficulty arises from a natural stiffening at low temperatures of the hydrocarbons comprising the bulk of the oil. This type of congealation can be corrected quite easily by the use of a solvent such as kerosene to reduce the viscosity of the oil. The remainder of the difficulty arises from the crystallization at low temperatures of the paraffin wax present in almost all heavy mineral oil fractions. Upon crystallization, the paraffin wax tends to form interlocking networks which adsorb oil and form a voluminous gel-like structure which restricts the flow or "pour" of the oil. Even though refining processes known as dewaxing have been developed to remove most of the paraffin from lubricating oil fractions, the small amount of wax remaining after dewaxing can cause serious problems. Even such small amounts of wax can raise by tens of degrees Fahrenheit the temperature at which an oil will flow freely as measured by a suitable "pour point" test. Since removal of the last traces of wax from oils is a difficult and costly matter, other answers have been sought by refiners.

Various pour point depressants have been developed and those to reach the commercial market have primarily been organic polymers, although some monomeric substances such as tetra (long chain alkyl) silicates, phenyl tristearyloxysilane, and pentaerythritol tetrastearate have been shown to be effective. Presently available commercial pour point depressants are believed to be represented by the following types of polymeric materials: polymethacrylates, for example, copolymers of various chain length alkyl methacrylates (see, for example, U.S. Pat. No. 2,655,479); polyacrylamides (see, for example, U.S. Pat. No. 2,387,501); Friedel-Crafts condensation products of chlorinated paraffin wax with naphthalene (see, for example, U.S. Pat. Nos. 1,815,022 and 2,015,748); Friedel-Crafts condensation products of chlorinated paraffin wax with phenol (see, for example, U.S. Pat. No. 2,191,498); and vinyl carboxylate, such as dialkyl fumarate copolymers (see, for example, U.S. Pat. Nos. 2,666,746; 2,721,877 and 2,721,878).

Esters of maleic anhydride/alpha-olefin copolymers have been suggested as pour point depressants. For example, U.S. Pat. No. 2,977,334 describes the use of copolymers of maleic anhydride and ethylene which are esterified with low or high molecular weight alcohols and/or amidized with an amine. These resins are described as being useful as pour point modifiers, gelling agents, thickeners, viscosity improvers, etc., for mineral and synthetic oils including functional fluids and lubricating oils. U.S. Pat. No. 2,992,987 describes a class of lubricant additives useful as pour point depressants which are ethylene-maleic anhydride copolymers esterified to 80% or more, preferably 90-100%, with a mixture of straight-chain saturated hydrocarbon alcohols having from 8 to 24 carbon atoms. The unesterified carboxylic groups can be left unreacted or can be reacted with such materials as ethylene or propylene oxide alcohol esters, or lower-dialkylamino-lower-alkyleneamines. U.S. Pat. Nos. 3,329,658 and 3,449,250 describes copolymers of maleic anhydride and alpha-olefins such as ethylene, propylene, isobutylene or styrene as being useful dispersancy and detergency additives for oils, as well as pour point depressants and viscosity index improvers. The copolymer is esterified to about 30 to about 95% with aliphatic alcohols or mixtures of alcohols having from 10 to 20 carbon atoms, and the remaining carboxyl groups are reacted with an amine of the following formula

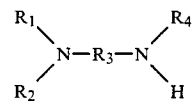

where $R_1$ and $R_2$ are selected from the group consisting of aliphatic hydrocarbon radicals having from 1 to 4 carbon atoms and the cyclohexyl radical, $R_3$ is an aliphatic hydrocarbon radical having from 2 to 4 carbon atoms, and $R_4$ is selected from the class consisting of hydrocarbon atom and aliphatic hydrocarbon radicals having from 1 to 4 carbon atoms.

U.S. Pat. Nos. 3,702,300 and 3,933,761 describe carboxy-containing interpolymers in which some of the carboxy radicals are esterified and the remaining carboxy radicals are neutralized by reaction with a polyamino compound having one primary or secondary amino group and at least one mono-functional amino group, and indicate that such interpolymers are useful as viscosity index improving and anti-sludge agents in lubricating compositions and fuels. The patentee indicates that it is critical that the mixed esters described in these patents include both relatively high molecular weight carboxylic ester groups having at least eight aliphatic carbon atoms in the ester radical and relatively low molecular weight carboxylic ester groups having no more than seven aliphatic carbon atoms in the ester radical.

Although many pour point depressants have been suggested and many are available in the market, concerted efforts are constantly being made to find new pour point depressants which are more economical and more effective than the depressants heretofore known in the art. In particular, a great deal of interest exists in pour point depressants which are capable of imparting other desirable properties to the lubricating compositions to which they are added in addition to pour point depressant properties.

SUMMARY OF THE INVENTION

Nitrogen-containing esters of carboxy-containing interpolymers are provided in accordance with the present invention which when added to lubricant compositions provide such lubricant compositions with superior pour point depressant properties as well as other desirable properties including viscosity index improvement. These esters also enhance the dispersion of other additives as well as contaminants (e.g., dirt, water, metallic particles, etc.) in the lubricating compositions to which they are added. These esters also enhance the flow characteristics of additive concentrates to which they are added.

Broadly stated, the present invention contemplates the provision of a nitrogen-containing ester of a carboxy-containing interpolymer, said interpolymer having a reduced specific viscosity of from about 0.05 to about 1 and being derived from at least two monomers, one of said monomers being a low molecular weight aliphatic olefin or styrene and the other of said monomers being an alpha, beta-unsaturated aliphatic acid, anhydride or ester thereof, said nitrogen-containing ester being substantially free of titratable acidity and being characterized by the presence within its polymeric structure of at least one of each of the following groups which are derived from the carboxy groups of said interpolymer:

(A) a carboxylic ester group, said carboxylic ester group having at least eight aliphatic carbon atoms in the ester radical, and (B) a carbonyl-polyamino group derived from a polyamino compound having one primary or secondary amino group and at least one mono-functional amino group, wherein the molar ratio of carboxy groups of said interpolymer esterified to provide (A) to carboxy groups of said interpolymer neutralized to provide (B) is in the range of about 85:15 to about 99:1.

Lubricant compositions and additive concentrates comprising the foregoing nitrogen-containing ester are also provided in accordance with the present invention. Further, the present invention contemplates the provision of a process for making a nitrogen-containing ester of a carboxy-containing interpolymer comprising the steps of: providing an interpolymer derived from at least two monomers, one of said monomers being a low molecular weight aliphatic olefin or styrene and the other of said monomers being an alpha, beta-unsaturated aliphatic acid, anhydride or ester thereof, said interpolymer having a reduced specific viscosity of about 0.05 to about 1; partially esterifying said interpolymer with an alcohol having at least eight aliphatic carbon atoms to convert from about 85% to about 99% of the carboxy radicals of the interpolymer to ester radicals; and substantially neutralizing the remaining carboxy radicals of said interpolymer with a polyamino compound having one primary or secondary amino group and at least one mono-functional amino group.

DETAILED DESCRIPTION OF THE PREFERRED EMBODIMENT

An essential element of the present invention is that each of the carboxylic ester groups of the nitrogen-containing esters of the present invention have at least eight aliphatic carbon atoms in the ester radical. The presence of carboxylic ester groups of such size is critical to the stable pour point properties imparted to the lubricating compositions in which the nitrogen-containing esters of the present invention are used.

In reference to the size of the ester groups, it is pointed out that an ester radical is represented by the formula

—C(O)(OR)

and that the number of carbon atoms in an ester radical is thus the combined total of the carbon atom of the carbonyl group and the carbon atoms of the ester group, i.e., the (OR) group.

Another essential element of the present invention is the presence of a polyamino group derived from a particular polyamino compound, i.e., one in which there is one primary or secondary amino group and at least one mono-functional amino group. Such polyamino group, when present in the nitrogen-containing esters of the present invention in the proportion stated above enhances the dispersability of such esters in lubricant compositions and additive concentrates for lubricant compositions.

Still another essential element of the present invention is the extent of esterification in relation to the extent of neutralization of the unesterified carboxy groups of the carboxy-containing interpolymer through the conversion thereof to polyamino-containing groups. The molar ratio of the carboxy groups of said interpolymer that are esterified to the carboxy groups neutralized through the conversion thereof to polyamino-containing groups is generally in the range of about 85:15 to about 99:1. A preferred ratio is 95:5. It should be noted that the linkage described as the carbonyl-polyamino group may be imide, amide, or amidine and inasmuch as any such linkage is contemplated within the present invention, the term "carbonyl polyamino" is thought to be a convenient, generic expression useful for the purpose of defining the inventive concept. In a particularly advantageous embodiment of the invention such linkage is imide or predominantly imide.

Still another important element of the present invention is the molecular weight of the carboxy-containing interpolymer. For convenience, the molecular weight is expressed in terms of the "reduced specific viscosity" of the interpolymer which is a widely recognized means of expressing the molecular size of a polymeric substance. As used herein, the reduced specific viscosity (abbreviated as RSV) is the value obtained in accordance with the formula $$RSV = \frac{\text{Relative Viscosity} - 1}{\text{Concentration}}$$

wherein the relative viscosity is determined by measuring, by means of a dilution viscometer, the viscosity of a solution of one gram of the interpolymer in 100 ml. of acetone and the viscosity of acetone at 30°±0.02° C. For purpose of computation by the above formula, the concentration is adjusted to 0.4 gram of the interpolymer per 100 ml. of acetone. A more detailed discussion of the reduced specific viscosity, also known as the specific viscosity, as well as its relationship to the average molecular weight of an interpolymer, appears in Paul J. Flory, *Principles of Polymer Chemistry,* (1953 Edition) pages 308 et seq.

While interpolymers having a reduced specific viscosity of from about 0.05 to about 1 are contemplated in the present invention, the preferred interpolymers are those having a reduced specific viscosity of from about 0.2 or 0.35 to about 0.8 or 1. Interpolymers having a reduced specific viscosity of from about 0.35 to about 0.5 or from about 0.65 to about 0.75 are particularly useful.

From the standpoint of utility, as well as for commercial and economical reasons, nitrogen-containing esters in which the ester group has from 8 to 24 aliphatic carbon atoms, preferably about 12 to about 18 carbon atoms, and most preferably about 14 or 15 carbon atoms, and the carbonyl polyamino group is derived from a primary-aminoalkyl-substituted tertiary amine, particularly heterocyclic amine, are preferred. Specific examples of the carboxylic ester group, i.e., the (OR) group of the ester radical (i.e., —(O)(OR)) includes isooctyloxy, decyloxy, dodecyloxy, tridecyloxy, tetradecyloxy, pentadecyloxy, octadecyloxy, eicosyloxy, tricosyloxy, tetracosyloxy, etc. In most instances, alkoxy groups comprise the preferred ester groups. Polar substituents may be present in such ester groups. Examples of polar substituents are chloro, bromo, ether, nitro, etc. Mixtures of the foregoing carboxylic ester groups can also be provided. For example, mixtures of ester groups having from 12 to 18 carbon atoms have been found to be useful. Mixtures of ester groups having 14 and 15 carbon atoms have been found to be particularly advantageous.

Examples of the carbonyl polyamino group include those derived from polyamino compounds having one primary or secondary amino group and at least one mono-functional amino group such as tertiary-amino or heterocyclic amino group. Such compounds may thus be tertiary-amino substituted primary or secondary amines or other substituted primary or secondary amines in which the substituent is derived from pyrroles, pyrrolidones, caprolactams, oxazolidones, oxazoles, thiazoles, pyrazoles, pyrazolines, imidazoles, imidazolines, thiazines, oxazines, diazines, oxycarbamyl, thiocarbamyl, uracils, hydantoins, thiohydantoins, guanidines, ureas, sulfonamides, phosphoramides, phenolthiazines, amidines, etc. Examples of such polyamino compounds include dimethylamino-ethylamine, dibutylaminoethylamine, 3-dimethylamino-1-propylamine, 4-methylethylamino-1-butylamine, pyridylethylamine, N-morpholino-ethylamine, tetrahydropyridylethylamine, bis-(dimethylamino)propylamine, bis-(diethylamino)ethylamine, N,N-dimethyl-p-phenylene diamine, piperidyl-ethylamine, 1-aminoethyl pyrazole, 1-(methylamino)pyrazoline, 1-methyl-4-aminooctyl pyrazole, 1-aminobutyl imidazole, 4-aminoethyl thiazole, 2-aminoethyl triazine, dimethylcarbamyl propylamine, N-methyl-N-aminopropyl acetamide, N-aminoethyl succinimide, N-methylamino maleimide, N-aminobutyl-alphachlorosuccinimide, 3-aminoethyl uracil, 2-aminoethyl pyridine, ortho-aminoethyl-N,N-dimethylbenzenesulfamide, N-aminoethyl phenothiazine, N-aminoethylacetamidine, 1-aminophenyl-2-methyl-imidazoline, N-methyl-N-aminoethyl-S-ethyl-dithiocarbamate, etc. Preferred polyamino compounds include the N-aminoalkyl-substituted morpholines such as aminopropyl morpholine. For the most part, the polyamino compounds are those which contain only one primary-amino or secondary-amino group and, preferably at least one tertiary-amino group. The tertiary amino group is preferably a heterocyclic amino group. In some instances polyamino compounds may contain up to about 6 amino groups although, in most instances, they contain one primary amino group and either one or two tertiary amino groups. The polyamino compounds may be aromatic or aliphatic amines and are preferably heterocyclic amines such as amino-alkyl-substituted morpholines, piperazines, pyridines, benzopyrroles, quinolines, pyrroles, etc. They are usually amines having from 4 to about 30 carbon atoms, preferably from 4 to about 12 carbon atoms. Polar substituents may likewise be present in the polyamines.

The carboxy-containing interpolymers include principally interpolymers of alpha, beta-unsaturated acids or anhydrides such as maleic anhydride or itaconic anhydride with olefins (aromatic or aliphatic) such as ethylene, propylene, styrene, or isobutene. The styrene-maleic anhydride interpolymers are especially useful. They are obtained by polymerizing equal molar amounts of styrene and maleic anhydride, with or without one or more additional interpolymerizable comonomers. In lieu of styrene, an aliphatic olefin may be used, such as ethylene, propylene or isobutene. In lieu of maleic anhydride, acrylic acid or methacrylic acid or ester thereof may be used. Such interpolymers are known in the art and need not be described in detail here. Where an interpolymerizable comonomer is contemplated, it should be present in a relatively minor proportion, i.e., less than about 0.3 mole, usually less than about 0.15 mole, per mole of either the olefin (e.g. styrene) or the alpha, beta-unsaturated acid or anhydride (e.g. maleic anhydride). Various methods of interpolymerizing styrene and maleic anhydride are known in the art and need not be discussed in detail here. For purpose of illustration, the interpolymerizable comonomers include the vinyl monomers such as vinyl acetate, acrylonitrile, methylacrylate, methylmethacrylate, acrylic acid, vinyl methyl ether, vinyl ethyl ether, vinyl chloride, isobutene or the like.

The nitrogen-containing esters of the invention are most conveniently prepared by first esterifying the carboxy-containing interpolymer with an alcohol to convert at least about 85% and no more than about 99% of the carboxy radicals of the interpolymer to ester radicals and then neutralizing the remaining carboxy radicals with a polyamino compound such as described above. More than one alcohol may be used in the process; so also may be used commercial alcohol mixtures such as the so-called Oxoalcohols which comprise, for example, mixtures of alcohols having from 8 to about 24 carbon atoms. A particularly useful class of alcohols are the commercial alcohol mixtures or mixtures of commercial alcohol mixtures comprising dodecyl alcohol, tridecyl alcohol, tetradecyl alcohol, pentadecyl alcohol, hexadecyl alcohol, heptadecyl alcohol and octadecyl alcohol. Commercial alcohol mixtures of tetradecyl and pentadecyl alcohols are particularly useful. Several suitable sources of these alcohol mixtures are the technical grade alcohols sold under the tradename "Neodols" by Shell Chemical Corporation and under the tradename "Alfols" by Continental Oil Company. Other alcohols useful in the process are illustrated by those which, upon esterification, yield the ester groups exemplified above.

The extent of esterification, as indicated previously, may range from about 85% to about 99%, preferably about 92% to about 97%, conversion of the carboxy radicals of the interpolymer to ester radicals. In a preferred embodiment, the degree of esterification is about 95%.

The esterification can be accomplished simply by heating the carboxy-containing interpolymer and the alcohol or alcohol mixtures under conditions typical for effecting esterification. Such conditions usually include, for example, a temperature of at least about 80° C., preferably from about 150° C. to about 350° C., provided that the temperature be below the decomposition point of the reaction mixture, and the removal of water of esterification as the reaction proceeds. Such conditions may optionally include the use of an excess of the alcohol reactant so as to facilitate esterification, the use of a solvent or diluent such as mineral oil, toluene, benzene, xylene or the like and an esterification catalyst such as toluene sulfonic acid, sulfuric acid, aluminum chloride, boron trifluoride-triethylamine, hydrochloric acid, ammonium sulfate, phosphoric acid, sodium methoxide or the like. These conditions and variations thereof are well known in the art.

The esterified interpolymer is then treated with a polyamino compound in an amount so as to neutralize substantially all of the unesterified carboxy radicals of the interpolymer. The neutralization is preferably carried out at a temperature of at least about 80° C., often from about 120° C. to about 300° C., provided that the temperature does not exceed the decomposition point of the reaction mass. In most instances the neutralization temperature is between about 150° C. and 250° C. A slight excess of the stoichiometric amount of the polyamino compound is often desirable, so as to insure substantial completion of neutralization, i.e., no more than about 2% of the carboxy radicals initially present in the interpolymer remained unneutralized.

The following examples are illustrative of the preparation of the nitrogen-containing esters of the present invention. Unless otherwise indicated all parts and percentages are by weight.

EXAMPLE 1

A styrene-maleic interpolymer is obtained by preparing a solution of styrene (536 parts) and maleic anhydride (505 parts) in toluene (7585 parts) and contacting the solution at a temperature of 99°-101° C. and an absolute pressure of 480-535 mm. Hg. with a catalyst solution prepared by dissolving benzoyl peroxide (2.13 parts) in toluene (51.6 parts). The catalyst solution is added over a peiod of 1.5 hours with the temperature maintained at 99°-101° C. Mineral oil (2496 parts) is added to the mixture. The mixture is maintained at 99°-101° C. and 480-535 mm. Hg. for 4 hours. The resulting product is a slurry of the interpolymer in the solvent mixture. The resulting interpolymer has a reduced specific viscosity of 0.42.

EXAMPLE 2

A toluene slurry (2507 parts), having 11.06% solids and 88.94% volatiles, of the maleic anhydride/styrene interpolymer of Example 1, Neodol 45 (631 parts), a product of Shell Chemical Company identified as a mixture of $C_{14}$ and $C_{15}$ linear primary alcohols, mineral oil (750 parts), and Ethyl Antioxidant 733 (4.2 parts), a product of Ethyl identified as an isomeric mixture of butyl phenols, are charged to a vessel. The mixture is heated with medium agitation under nitrogen purge at 0.5 standard cubic feet per hour until the temperature reaches 115° C. 70% methane sulfonic acid catalyst in water (10.53 parts) is added dropwise over a period of 20 minutes. Nitrogen purge is increased to 1.0 standard cubic feet per hour and temperature is raised by removal of toluene-water distillate. The mixture is maintained at a temperature of 150° C. for five hours under a nitrogen purge of 0.1-0.2 standard cubic feet per hour. Additional methane sulfonic acid solution (15.80 parts) is added to the mixture over period of 15 minutes. The mixture is maintained at 150° C. for 3.5 hours. The degree of esterification is 95.08%. Amino propylmorpholine (35.2 parts) is added to the mixture dropwise over a period of 20 minutes. The mixture is maintained at 150° C. for an additional 30 minutes then cooled with stirring. The mixture is stripped from 50° C. to 141° C. at a pressure of 102 mm. Hg. then permitted to cool. At a temperature of 100° C., mineral oil (617 parts) is added. Cooling is continued to 60° C. At 60° C., diatomaceous earth (36 parts) is added and the mixture is heated to 100° C. The mixture is maintained at 100°-105° C. for one hour with stirring and then filtered to yield the desired product.

EXAMPLE 3

The procedure of Example 2 is repeated with the exception that both Neodol 45 (315.4 parts) and Alfol 1218 (312.5 parts), a product of Continental Oil Company identified as a mixture of synthetic primary straight chain alcohols having 12 to 18 carbon atoms, are initially charged, rather than the 631 parts of Neodol 45 which were included in the initial charge in Example 2.

EXAMPLE 4

A toluene slurry (1125 parts), having 13.46% solids and 86.54% volatiles, of the maleic anhydride/styrene interpolymer of Example 1, mineral oil (350 parts) and Neodol 45 (344 parts) are charged to a vessel. The mixture is heated with medium agitation under nitrogen sweep of 0.5 standard cubic feet per hour until the temperature reaches 110° C. Paratoluene sulfonic acid (8.55 parts) in water (9 parts) is added dropwise over a period of 24 minutes. The temperature of the mixture is increased to 152° C. by removing toluene-water distillate. The temperature is maintained at 152°-156° C. under nitrogen sweep of 0.5 standard cubic feet per hour until the net acid number indicates that esterification is at least 95% complete. Aminopropylmorpholine (15.65 parts) is added dropwise over a period of 10 minutes. The temperature of the mixture is maintained at 155° C. for 1 hour and then cooled under a nitrogen sweep. Ethyl Antioxidant 733 (1.48 parts) is added to the mixture. The mixture is stripped at 143° C. and 99 mm. Hg. pressure. The mixture is cooled under nitrogen sweep. Mineral oil is added to provide a total of 63% dilution. Ethyl Antioxidant 733 (1.79 parts) is added and the mixture is stirred for 30 minutes. The mixture is heated to 60° C. while stirring with a nitrogen sweep of 0.5 standard cubic feet per hour. Diatomaceous earth (18 parts) is added to the mixture. The mixture is heated to 90° C. The temperature of the mixture is maintained at 90°-100° C. for 1 hour and then filtered through a pad of diatomaceous earth (18 parts) in a heated funnel to yield the desired product.

EXAMPLE 5

The procedure of Example 4 is repeated with the exception that both Neodol 45 (172 parts) and Alfol 1218 (169 parts) are provided in the initial charge, rather than the 344 parts of Neodol 45 provided in Example 4.

EXAMPLE 6

The product of Example 1 (101 parts), Neodol 91 (56 parts), a product of Shell Chemical Company identified as a mixture of $C_9$, $C_{10}$, and $C_{11}$ alcohols, TA-1618 (92 parts), a product of Proctor & Gamble identified as a mixture of $C_{16}$ and $C_{18}$ alcohols, Neodol 25 (62 parts), a product of Shell Chemical Company identified as a mixture of $C_{12}$, $C_{13}$, $C_{14}$, and $C_{15}$ alcohols, and toluene (437 parts) are charged to a vessel. The vessel is stirred and the contents are heated. Methane sulfonic acid (5 parts) is added to the mixture. The mixture is heated under reflux conditions for 30 hours. Aminopropyl morpholine (12.91 parts) is added to the mixture. The mixture is heated under reflux conditions for an additional 4 hours. Diatomaceous earth (30 parts) and a neutral paraffinic oil (302 parts) are added to the mixture which is then stripped. The residue is filtered to yield 497.4 parts of an orange-brown viscous liquid.

EXAMPLE 7

The product of Example 1 (202 parts), Neodol 91 (112 parts), TA 1618 (184 parts), Neodol 25 (124 parts) and toluene (875 parts) are charged to a vessel. The mixture is heated and stirred. Methane sulfonic acid (10 parts) is added to the mixture which is then heated under reflux conditions for 31 hours. Aminopropyl morpholine (27.91 parts) is added to the mixture which is then heated under reflux conditions for an additional 5 hours. Diatomaceous earth (60 parts) is added to the mixture which is then stripped, 600 parts of polymer remaining in the vessel. A neutral paraffinic oil (600 parts) is added to the mixture which is then homogenized. The mixture is filtered through a heated funnel to yield 1063 parts of a clear orange-brown viscous liquid.

EXAMPLE 8

The product of Example 1 (101 parts), Alfol 810 (50 parts), a product of Continental Oil Company identified as a mixture of $C_8$ and $C_{10}$ alcohols, TA-1618 (92 parts), Neodol 25 (62 parts) and toluene (437 parts) are charged to a vessel. The mixture is heated and stirred. Methane sulfonic acid (5 parts) is added to the mixture which is heated under reflux conditions for 30 hours. Aminopropyl morpholine (15.6 parts) is added to the mixture which is then heated under reflux conditions for an additional 5 hours. The mixture is stripped to yield 304 parts of a yellow-orange viscous liquid. Diatomaceous earth (30 parts) and a neutral paraffinic oil (304 parts) are added to the mixture which is then homogenized. The mixture is filtered through a heated funnel to yield 511 parts of a clear amber viscous liquid.

EXAMPLE 9

A toluene slurry (799 parts) of a maleic anhydride/styrene interpolymer (17.82% polymer) is charged to a vessel. The reduced specific viscosity of the interpolymer is 0.69. The vessel is purged with nitrogen while stirring the contents for 15 minutes. Alfol 1218 (153 parts), Neodol 45 (156 parts) and 93% sulfuric acid (5 parts) are added to the mixture. Toluene (125 parts) is then added to the mixture. The mixture is heated at 150°–156° C. for 18 hours. Aminopropyl morpholine (1.3 parts) is added to the mixture which is then heated for an additional 1 hour at 150° C. The mixture is cooled to 80° C. Ethyl Antioxidant 733 (1.84 parts) is added to the mixture. The mixture is stripped at 143° C. and 100 mm. Hg. Mineral oil (302 parts) and Ethyl Antioxidant 733 (218 parts) are added and the mixture is stirred. The temperature of the mixture is maintained at 90° C. and is blown with nitrogen. Diatomaceous earth (44 parts) is added to the mixture which is stirred for 1 hour at 90°–95° C. The mixture is filtered through diatomaceous earth to yield 1312 parts of a dark brown clear viscous liquid.

EXAMPLE 10

A toluene slurry (973 parts) of a maleic anhydride/styrene interpolymer (17.28% solids) is charged to a vessel. The reduced specific viscosity of the interpolymer is 0.69. The slurry is stirred and blown with nitrogen at 0.75–1.0 standard cubic feet per hour for 20 minutes. Neodol 45 (368 parts) and 80% sulfuric acid (6.84 parts) are added to the mixture. The mixture is heated at 150°–156° C. for 23 hours. Additional 80% sulfuric acid (1 part) and toluene (50 parts) are added after approximately the first 9 hours of heating. Additional 80% sulfuric acid (2.84 parts) is added after about the first 13 hours of heating. Additional Neodol 45 (18.4 parts) and 80% sulfuric acid (2 parts) are added after about the first 16 hours of heating. Aminopropyl morpholine (2.33 parts) is added to the mixture which is heated at 153°–154° C. for an additional 1 hour and 20 minutes. Ethyl Antioxidant 733 (2.06 parts) is added to the mixture. The mixture is stripped at 142° C. and 100 mm. Hg. Mineral oil (481 parts) is added to the mixture. Ethyl Antioxidant 733 (2.5 parts) is added to the mixture while the mixture is stirred. Diatomaceous earth (25 parts) is added to the mixture. The temperature of the mixture is maintained at 70° C. for 45 minutes and then heated to 110° C. Diatomaceous earth (25 parts) is added to the mixture. The mixture is filtered through diatomaceous earth to yield the desired product.

EXAMPLE 11

A toluene and mineral oil slurry (699 parts) containing 17.28% solids of a maleic anhydride/styrene interpolymer (reduced specific viscosity of 0.69), Neodol 45 (139 parts), Alfol 1218 (138 parts), Ethyl Antioxidant 733 (2.9 parts) and toluene (50 parts) are charged to a vessel. The mixture is heated under a nitrogen purge at 0.5 standard cubic feet per hour. 70% methane sulfonic acid (3.9 parts) is added dropwise over a period of 9 minutes. The mixture is heated under reflux conditions for 35 minutes. Toluene (51 parts) is added to the mixture which is then heated for an additional 3 hours 15 minutes under reflux conditions. 70% methane sulfonic acid (3 parts) is added dropwise over a period of 3 minute. The mixture is heated under reflux conditions for 3 hours 15 minutes. 70% methane sulfonic acid (3.9 parts) is added dropwise over a period of 12 minutes. The mixture is heated at 150°–152° C. for 3 hours 45 minutes. Aminopropyl morpholine (14.3 parts) is added to the mixture dropwise over a period of 15 minutes. The mixture is maintained at a temperature of 149°–150° C. for an additional 30 minutes. The mixture is stripped at 140° C. and 100 mm. Hg. The mixture is cooled to 50° C. Mineral oil (338 parts) and diatomaceous earth (19 parts) are added to the mixture. The temperature of the mixture is maintained at 100°–105° C. for 1.5 hours and then filtered through additional diatomaceous earth (18 parts) to yield the desired product.

The nitrogen-containing esters of this invention can be effectively employed in a variety of lubricating compositions based on diverse oils of lubricating viscosity such as a natural or synthetic lubricating oil, or suitable mixtures thereof. The lubricating compositions contemplated include principally crankcase, lubricating oils for spark-ignited and compression-ignited internal combustion engines including automobile and truck engines, two-cycle engine lubricants, aviation piston engines, marine and railroad diesel engines, and the like. However, automatic transmission fluids, trans-axle lubricants, gear lubricants, metal-working lubricants, hydraulic fluids, and other lubricating oil and grease compositions can benefit from the incorporation of the present additives.

Natural oils include animal oils and vegetable oils (e.g., castor oil, lard oil) as well as solvent-refined or acid-refined mineral lubricating oils of the paraffinic, naphthenic, or mixed paraffin-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzenes, dinonylbenzenes, di-(2-ethylhexyl)benzenes, etc.); polyphenols (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert-butylphenyl)-silicate, hexyl-(4-methyl-2-pentoxy)-di-siloxane, poly(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

Of the various lubricants, crankcase lubricants and automobile transmission fluids are especially adapted to the improvement by the use of the additives of the present invention. Generally, the lubricant compositions of the present invention contain an amount of the nitrogen-containing esters of the invention sufficient to provide such lubricant compositions with pour point depressant properties. This amount may be as low as 0.01%, although it more often is from about 0.1% to about 10% preferably about 0.1% to about 1% by weight of the finished lubricant. Higher concentrations may be employed.

As indicated previously, the nitrogen-containing esters of the present invention are particularly suitable for imparting pour point depressant properties to lubricants. In this regard, the nitrogen containing esters reduce the lowest temperature at which the lubricant composition to which they are added flows. Accordingly, these nitrogen-containing esters extend the versatility and lubricating qualities of such lubricant compositions at lower service temperatures. The pour point depressants provided in accordance with the present invention are especially important for use in crankcase oils and gear oils as well as automatic transmission fluids and hydraulic oils.

The nitrogen-containing esters of Examples 2, 3 and 6–11 were subjected to ASTM Pour Point of Petroleum Oils D 97-66 for determination of respective initial pour points, and to Method 201-Federal Test Method Standard No. 791B for determination of respective stable pour points. Additionally, for purposes of comparison samples A and B (the preparation of which is indicated below) were also subjected to these tests. The results of these tests are indicated in Table I below.

Samples A and B are prepared in accordance with the teachings of U.S. Pat. Nos. 3,702,300 and 3,933,761 as follows:

SAMPLE A

A styrene-maleic interpolymer is obtained by preparing a solution of styrene (536 parts) and maleic anhydride (505 parts) in toluene (7585 parts) and contacting the solution at 99°–101° C. and 480–535 mm. Hg. absolute with a mixture of benzoyl peroxide (1.55 parts) and toluene (51.6 parts) for 1.5 hours. Mineral oil (2228 parts) is added to the mixture which is maintained at a temperature of 99°–101° C. and a pressure of 480–535 mm. Hg. for 4 hours to strip the mixture. To 3888 parts of the stripped mineral oil-interpolymer slurry there are added mineral oil (77 parts), Alfol 1218 (1380 parts), Alfol 810 (244 parts), n-butanol (133 parts) premixed with 66° Baume sulfuric acid (2.58 parts) and an additional amount of 66° Baume sulfuric acid (15.5 parts). The mixture is then heated at 150°–160° C. for 20 hours whereupon water is distilled off. An additional amount of sulfuric acid (2.58 parts) together with an additional amount of n-butanol (133 parts) is added and esterification is continued until 95% of the carboxy radicals of the polymer have been esterified. To the esterified interpolymer there is then added aminopropyl morpholine (74.8 parts), Ethyl Antioxidant 733 (8.4 parts) and the resulting mixture is heated to 150°–160° C./10 mm. Hg. to distill off toluene and any other volatile components. The stripped product is mixed with an additional amount of mineral oil (600 parts) and filtered. The filtrate is a mineral oil solution of a nitrogen-containing mixed ester.

SAMPLE B

A styrene-maleic interpolymer is obtained by preparing a solution of styrene (536 parts) and maleic anhydride (505 parts) in toluene (7610 parts) and contacting the solution at 99°–101° C. and 480–535 mm. Hg. absolute with a catalyst solution prepared by dissolving Percadox 16W-70 (1.79 parts), a product of Noury Chemical identified as a peroxide catalyst and toluene (55.2 parts). Mineral oil (4125 parts) is added to the mixture while the solvent mixture is being distilled off at 99°–101° C. and 480–535 mm. Hg. absolute. To the mixture of copolymer (1000 parts), mineral oil (4125 parts) and toluene (441 parts) there are added Neodol 45 (690 parts), Alfol 1218 (690 parts), Alfol 810 (244 parts), mineral oil (83 parts), 66° Baume sulfuric acid (19.3 parts), and a mixture of 66° Baume sulfuric acid (5.52 parts) and n-butanol (133 parts). The mixture is heated at 150°–160° C. for 20 hours. An additional amount of 66° Baume sulfuric acid (5.52 parts) together with an additional amount of n-butanol (133 parts) is added and the esterification is continued until 95% of the carboxy radicals of the polymer have been esterified. To the esterified interpolymer, there is then added aminopropyl morpholine (77.2 parts) and Ethyl Antioxidant 733 (11.4 parts) and the resulting mixture is heated to 150°–160° C./10 mm. Hg. to distill off toluene and any other volatile comonents. The stripped product is mixed with an additional amount of mineral oil (800 parts) and filtered. The filtrate is a mineral oil solution of a nitrogen-containing mixed ester.

In the pour point tests identified in Table I below, each of the nitrogen-containing esters of Examples 2, 3 and 6–11 along with Samples A and B were mixed with a base oil, viscosity index improver and dispersant in the amounts identified in Table I. In Table I the following abbreviations are used for the viscosity index improvers, dispersants and base oils:

V-1 is Paratone 715, a product of Exxon identified as ethylene propylene rubber.

V-2 is a mixture of diluent oil (91.07 parts), Ortholeum 2035 (8.80 parts), a product of DuPont identified as a lubricant additive, and 2,6-ditertiary-butyl-para-cresol (0.13 parts).

V-3 is a mixture of diluent oil (10.85 parts) and the following composition: diluent oil (87.85 parts), 2,6-di-tertiary-butyl-para-crecol (0.15 parts) and Ortholeum 2052 (12.00 parts), a product of DuPont identified as ethylene-propylene-diene terpolymer.

V-4 is Shellvis 40, a product of Shell identified as a styrene isoprene copolymer viscosity improver.

D-1 is Lubrizol 7502, a product of Lubrizol Corporation identified as a dispersant containing a mixture of succinimides and esters.

D-2 is Lubrizol 7802 a product of Lubrizol Corporation identified as a dispersant containing a mixture of esters, amides, and imides.

D-3 is Lubrizol 7515A, a product of Lubrizol Corporation identified as a dispersant containing a mixture of succinimides and esters.

QS is an abbreviation for base stock provided by Quaker State, and OK is an abbreviation for base stock provided by Oljekonsumenternas Forbund K-fabriken. The expressions 10W40 and 10W30 are the grades of base stocks tested.

TABLE I

| Example | Pour Point Depressant Additive | Wt. % | Viscosity Index Improver Additive | Wt. % | Dispersant Additive | Wt. % | Base Oil* | Pour Point I.P.** | S.P.*** |
|---|---|---|---|---|---|---|---|---|---|
| (1) | Prod of Ex. 2 | 0.42 | V-1 | 11.75 | D-1 | 9.6 | QS 10W40 | −32 | ≦−33 |
| (2) | Prod of Ex 3 | 0.42 | V-1 | 11.75 | D-1 | 9.6 | QS 10W40 | −38 | ≦−33 |
| (3) | Sample A | 0.75 | V-1 | 11.75 | D-1 | 9.6 | QS 10W40 | −15 | −3 |
| (4) | Prod of Ex 2 | 0.42 | V-2 | 12.0 | D-1 | 9.6 | QS 10W40 | −35 | ≦−33 |
| (5) | Prod of Ex 3 | 0.42 | V-2 | 12.0 | D-1 | 9.6 | QS 10W40 | −29 | ≦−33 |
| (6) | Sample A | 0.75 | V-2 | 12.0 | D-1 | 9.6 | QS 10W40 | −17 | −3 |
| (7) | Prod of Ex 2 | 0.42 | V-3 | 10.0 | D-1 | 9.6 | QS 10W40 | −38 | ≦−33 |
| (8) | Prod of Ex 3 | 0.42 | V-3 | 10.0 | D-1 | 9.6 | QS 10W40 | −38 | ≦−33 |
| (9) | Sample A | 0.50 | V-3 | 10.0 | D-1 | 9.6 | QS 10W40 | −12 | −3 |
| (10) | Sample A | 0.75 | V-3 | 10.0 | D-1 | 9.6 | QS 10W40 | −15 | −3 |
| (11) | Sample B | 0.50 | V-3 | 10.0 | D-1 | 9.6 | QS 10W40 | −16 | −6 |
| (12) | Sample B | 0.75 | V-3 | 10.0 | D-1 | 9.6 | QS 10W40 | −20 | −18 |
| (13) | Prod of Ex 2 | 0.42 | V-3 | 10.0 | D-2 | 11.8 | QS 10W40 | −39 | ≦−33 |
| (14) | Prod of Ex 3 | 0.42 | V-3 | 10.0 | D-2 | 11.8 | QS 10W40 | −42 | ≦−33 |
| (15) | Sample A | 0.75 | V-3 | 10.0 | D-2 | 11.8 | QS 10W40 | −19 | −3 |
| (16) | Prod of Ex 2 | 0.42 | V-4 | 0.73 | D-1 | 9.6 | QS 10W40 | −35 | −30 |
| (17) | Prod of Ex 3 | 0.42 | V-4 | 0.73 | D-1 | 9.6 | QS 10W40 | −35 | −30 |
| (18) | Sample A | 0.50 | V-4 | 0.73 | D-1 | 9.6 | QS 10W40 | −14 | −27 |
| (19) | Sample B | 0.50 | V-4 | 0.73 | D-1 | 9.6 | QS 10W40 | −7 | 27 |
| (20) | Prod of Ex 2 | 0.50 | V-4 | 0.50 | D-1 | 9.6 | QS 10W30 | −33 | −22.5**** |
| (21) | Sample A | 0.50 | V-4 | 0.50 | D-1 | 9.6 | QS 10W30 | −9 | −27 |
| (22) | Sample B | 0.50 | V-4 | 0.50 | D-1 | 9.6 | QS 10W30 | −6 | −27 |
| (23) | Prod of Ex 2 | 0.42 | V-2 | 9.5 | D-2 | 11.8 | QS 10W40 | −30 | ≦−33 |
| (24) | Prod of Ex 3 | 0.42 | V-2 | 9.5 | D-2 | 11.8 | QS 10W40 | −35 | ≦−33 |
| (25) | Prod of Ex 2 | 0.42 | V-1 | 9.4 | D-2 | 11.8 | QS 10W40 | −38 | ≦−33 |
| (26) | Prod of Ex 3 | 0.42 | V-1 | 9.4 | D-2 | 11.8 | QS 10W40 | −35 | −30 |
| (27) | Prod of Ex 2 | 0.42 | V-4 | 0.73 | D-3 | 9.8 | OK 10W40 | −38 | ≦−33 |
| (28) | Prod of Ex 3 | 0.42 | V-4 | 0.73 | D-3 | 9.8 | OK 10W40 | −38 | ≦−33 |
| (29) | Prod of Ex 6 | 0.50 | V-3 | 13.0 | D-9 | 9.6 | QS 10W40 | −38 | ≦−33 |
| (30) | Prod of Ex 7 | 0.32 | V-1 | 11.75 | D-1 | 9.6 | QS 10W40 | −35 | ≦−33 |
| (31) | Prod of Ex 8 | 0.32 | V-1 | 11.75 | D-1 | 9.6 | QS 10W40 | −35 | ≦−33 |
| (32) | Prod of Ex 9 | 0.50 | V-3 | 10.0 | D-1 | 9.6 | QS 10W40 | −38 | ≦−33 |
| (33) | Prod of Ex 9 | 0.75 | V-3 | 10.0 | D-1 | 9.6 | QS 10W40 | −38 | ≦−33 |
| (34) | Prod of Ex 9 | 0.50 | V-1 | 11.75 | D-1 | 9.6 | QS 10W40 | −34 | −30 |
| (35) | Prod of Ex 10 | 0.75 | V-3 | 10.0 | D-1 | 9.6 | QS 10W40 | −35 | ≦−33 |
| (36) | Prod of Ex 11 | 0.15 | V-3 | 10.0 | D-1 | 9.6 | QS 10W40 | −29 | ≦−33 |
| (37) | Prod of Ex 11 | 0.30 | V-3 | 10.0 | D-1 | 9.6 | QS 10W40 | −29 | ≦−33 |

TABLE I-continued

| Example | Pour Point Depressant Additive | Wt. % | Viscosity Index Improver Additive | Wt. % | Dispersant Additive | Wt. % | Base Oil* | Pour Point I.P.** | S.P. |
|---|---|---|---|---|---|---|---|---|---|
| (38) | Prod of Ex 11 | 0.50 | V-3 | 10.0 | D-1 | 9.6 | QS 10W40 | −38 | ≦−33 |

*Weight of Base Oil used is remainder required to yield total of 100% after pour point depressant, viscosity index improver and dispersant added.
**Initial pour point in °C. using ASTM D97-66.
***Stable pour point in °C. using Method 203 - Federal Test Method Standard No. 791B.
****Average of two tests, one measuring −21° C., the other −24° C.

The invention also contemplates the use of other additives in combination with the nitrogen-containing esters of this invention. Such additives include, for example, auxiliary detergents and dispersants of the ash-producing or ashless type, corrosion- and oxidation-inhibiting agents, viscosity improving agents, extreme pressure agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phoshorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-beta-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°-200° C.

Auxiliary ashless detergents and dispersants are so called despite the fact that, depending on its constitution, the dispersant may upon combustion yield a nonvolatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen-containing compounds such as amine, organic hydroxy compounds such as phenols and alcohols, and/or basic inorganic materials. Examples of these "carboxylic dispersants" are described in British Pat. No. 1,306,529 and in many U.S. patents including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | Re 26,433 |
| 3,346,493 | 3,522,179 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the caboxylic, amine or Mannich dispersants with such reagents are urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof and disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

Extreme pressure agents and corrosion- and oxidation-inhibiting agents are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Automatic transmission fluids containing esters of the present invention often contain frictional additives to improve the so-called slipstick characteristics. Such additives are exemplified by fatty amines such as stearylamine and oleylamine, alkoxylated amines such as the reaction products of amines with ethyleneoxide or propyleneoxide and other derivatives of amines such as the reaction products of an alkoxylated amine with boric acid or boron oxide. Still other frictional additives are exemplified by sperm oil, sulfurized sperm oil, stearylamine methyloleate and other oily agents.

The above-illustrated additives may each be present in lubricating compositions at a concentration ranging from about 0.01% to about 20% by weight. In most instances, they each range from about 0.1% to about 10%.

The nitrogen-containing esters of this invention can be added directly to the lubricant. Preferably, however, they are diluted with a substantially inert, normally liquid organic diluent such as mineral oil, naphtha, benzene, toluene or xylene, to form an additive concentrate. These concentrates usually comprise about 0.1 to about 80%, more preferably about 1 or 2.5 to about 3, 5 or 10%, by weight of the nitrogen-containing ester of this invention and may contain, in addition, one or more other additives known in the art or described herein-above. Concentrations such as 15%, 20%, 30% or 50% may be employed.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A nitrogen-containing ester consisting essentially of a carboxy-containing interpolymer, said interpolymer having a reduced specific viscosity of from about 0.05 to about 1 and being derived from at least two monomers, one of said monomers being a low molecular weight aliphatic olefin or styrene and the other of said monomers being an alpha, beta-unsaturated aliphatic acid, anhydride or ester thereof, said nitrogen-containing ester being substantially free of tritratable acidity and being characterized by the presence within its polymeric structure of each of the following groups which are derived from the carboxy groups of said interpolymer:

(A) a carboxylic ester group, said carboxylic ester group having at least eight aliphatic carbon atoms in the ester radical, and
   (B) a carbonyl-polyamino group derived from a polyamino compound having one primary or secondary amino group and at least one monofunctional heterocyclic amino group, wherein the molar ratio of carboxy groups of said interpolymer esterified to provide (A) to carboxy groups of said interpolymer neutralized to provide (B) is in the range of about 85:15 to about 99:1.

2. The nitrogen-containing ester of claim 1 wherein said reduced specific viscosity is in the range of about 0.2 to about 0.8.

3. The nitrogen-containing ester of claim 1 wherein said reduced specific viscosity is in the range of about 0.35 to about 0.8.

4. The nitrogen-containing ester of claim 1 wherein said reduced specific viscosity is in the range of about 0.35 to about 0.50.

5. The nitrogen-containing ester of claim 1 wherein said reduced specific viscosity is in the range of about 0.65 to about 0.75.

6. The nitrogen-containing ester of claim 1 wherein said low molecular weight aliphatic olefin is selected from the group consisting of ethylene, propylene or isobutene.

7. The nitrogen-containing ester of claim 1 wherein said alpha, beta-unsaturated aliphatic acid, anhydride or ester is selected from the group consisting of maleic acid or anhydride, itaconic acid or anhydride, or acrylic acid or ester.

8. The nitrogen-containing ester of claim 1 wherein each of the ester radicals of (A) have from 8 to 24 carbon atoms.

9. The nitrogen-containing ester of claim 1 wherein the ester radicals of (A) are selected from the group of ester radicals having from 12 to 18 carbon atoms or mixtures of ester radicals having from 12 to 18 carbon atoms.

10. The nitrogen-containing ester of claim 1 wherein the ester radicals of (A) are selected from the group of ester radicals having 14 or 15 carbon atoms or mixtures ofester radicals having 14 and 15 carbon atoms.

11. The nitrogen-containing ester of claim 1 wherein the molar ratio of carboxy groups of said interpolymer esterified to provide (A) to carboxy groups neutralized to provide (B) is about 95:5.

12. The nitrogen-containing ester of claim 1 wherein said interpolymer is a terpolymer of one molar proportion of styrene, one molar proportion of maleic anhydride, and less than about 0.3 molar proportion of a vinyl monomer.

13. The nitrogen-containing ester of claim 1 wherein said polyamino compound is N-aminoalkyl-substituted morpholine.

14. The nitrogen-containing ester of claim 1 wherein said polyamino compound is aminopropyl morpholine.

15. A nitrogen-containing ester consisting essentially of a carboxy-containing interpolymer having pour point depressant improving properties, said interpolymer having a reduced specific viscosity of from about 0.05 to about 1 and being derived from at least two monomers, one of said monomers being a low molecular weight aliphatic olefin or styrene and the other of said monomers being an alpha, beta-unsaturated aliphatic acid, anhydride or ester thereof, said nitrogen-containing ester being substantially free of titratable acidity and being characterized by the presence within its polymeric structure of at least one of each of the following groups which are derived from the carboxy groups of said interpolymer:
(A) a carboxylic ester group, said carboxylic ester group having at least eight aliphatic carbon atoms in the ester radical, and
(B) a carbonyl-polyamino group derived from a polyamino compound having one primary or secondary amino group and at least one heterocyclic amino group,
wherein the molar ratio of carboxy groups of said interpolymer esterified to provide (A) to carboxy groups neutralized to provide (B) is in the range of about 85:15 to about 99:1.

16. The nitrogen-containing ester of claim 15 wherein said reduced specific viscosity is in the range of about 0.2 to about 0.8.

17. The nitrogen-containing ester of claim 15 wherein said reduced specific viscosity is in the range of about 0.35 to about 0.8.

18. The nitrogen-containing ester of claim 15 wherein said reduced specific viscosity is in the range of about 0.35 to about 0.50.

19. The nitrogen-containing ester of claim 15 wherein said reduced specific viscosity is in the range of about 0.65 to about 0.75.

20. The nitrogen-containing ester of claim 15 wherein said low molecular weight aliphatic olefin is selected from the group consisting of ethylene, propylene or isobutene.

21. The nitrogen-containing ester of claim 15 wherein said alpha, beta-unsaturated aliphatic acid, anhydride or ester is selected from the group consisting of maleic acid or anhydride, itaconic acid or anhydride, or acrylic acid or ester.

22. The nitrogen-containing ester of claim 15 wherein the ester radicals of (A) are selected from the group of ester radicals having from 12 to 18 carbon atoms or mixtures of ester radicals having from 12 to 18 carbon atoms.

23. The nitrogen-containing ester of claim 15 wherein the ester radicals of (A) are selected from the groups of ester radicals having 14 or 15 carbon atoms or mixtures of ester radicals having 14 and 15 carbon atoms.

24. The nitrogen-containing ester of claim 15 wherein the ratio of carboxy groups of said interpolymer esterified to provide (A) to carboxy groups neutralized to provide (B) is about 95:5.

25. The nitrogen-containing ester of claim 15 wherein said polyamino compound is N-aminoalkyl-substituted morpholine.

26. The nitrogen-containing ester of claim 15 wherein said polyamino compound is aminopropyl morpholine.

27. A nitrogen-containing ester consisting essentially of a carboxy-containing interpolymer, said interpolymer having a reduced specific viscosity of from about 0.05 to about 1 and being derived from at least two monomers, one of said monomers being styrene and the other of said monomers being maleic anhydride, said nitrogen-containing ester being substantially free of titratable acidity and being characterized by the presence within its polymeric structure of at least one of each of the following groups which are derived from the carboxy groups of said interpolymer:
(A) a carboxylic ester group, said carboxylic ester group having from about 12 to about 18 aliphatic carbon atoms in the ester radical, and
(B) a carbonyl-polyamino group derived from an N-aminoalkyl-substituted morpholine,
wherein the molar ratio of carboxy groups of said interpolymer esterified to provide (A) to carboxy groups of said interpolymer neutralized to provide (B) is in the range of about 85:15 to about 99:1.

28. The nitrogen-containing ester of claim 27 wherein said reduced specific viscosity is in the range of about 0.2 to about 0.8.

29. The nitrogen-containing ester of claim 27 wherein said reduced specific viscosity is in the range of about 0.35 to about 0.8.

30. The nitrogen-containing ester of claim 27 wherein said reduced specific viscosity is in the range of about 0.35 to about 0.50.

31. The nitrogen-containing ester of claim 27 wherein said reduced specific viscosity is in the range of about 0.65 to about 0.75.

32. The nitrogen-containing ester of claim 27 wherein each of the ester radicals of (A) have 14 or 15 carbon atoms.

33. The nitrogen-containing ester of claim 27 wherein the molar ratio of carboxy groups of said interpolymer esterified to provide (A) to carboxy groups neutralized to provide (B) is about 95:5.

34. The nitrogen-containing ester of claim 27 wherein said interpolymer is a terpolymer of one molar proportion of styrene, one molar proportion of maleic anhydride, and less than about 0.3 molar proportion of a vinyl monomer.

35. The nitrogen-containing ester of claim 27 wherein said N-aminoalkyl-substituted morpholine is aminopropyl morpholine.

36. A composition comprising a major proportion of a lubricating oil and at least from about 0.01% by weight of the nitrogen-containing ester of any of claims 1-35.

37. An additive concentrate comprising a substantially inert normally liquid organic diluent and from about 0.1 to about 80% by weight of the nitrogen-containing ester of any of claims 1-35.

38. A process for making a nitrogen-containing ester of a carboxy containing interpolymer consisting essentially of the steps of:
  providing an interpolymer derived from at least two monomers, one of said monomers being a low molecular weight aliphatic olefin or styrene and the other of said monomers being an alpha, beta-unsaturated aliphatic acid, anhydride or ester thereof, said interpolymer having a reduced specific viscosity of from about 0.05 to about 1;
  partially esterifying said interpolymer with an alcohol having at least eight aliphatic carbon atoms to convert from about 85% to about 99% of the carboxy radicals of said interpolymer to ester radicals; and
  substantially neutralizing the remaining carboxy radicals of said interpolymer with a polyamino compound having one primary or secondary amino group and at least one monofunctional heterocyclic amino group.

39. The process of claim 38 wherein said alcohol has from about 8 to about 24 carbon atoms.

40. The process of claim 38 wherein about 95% of the carboxy radicals of said interpolymer are esterified with said alcohol.

41. The process of claim 38 wherein said reduced specific viscosity is in the range of about 0.35 to about 0.8.

42. The process of claim 38 wherein said reduced specific viscosity is in the range of about 0.2 to about 0.8.

43. The process of claim 38 wherein said low molecular weight aliphatic olefin is selected from the group consisting of ethylene, propylene or isobutene.

44. The process of claim 38 wherein said alpha, beta-unsaturated aliphatic acid, anhydride or ester is selected from the group consisting of maleic acid or anhydride, itaconic acid or anhydride, or acrylic acid or ester.

45. The process of claim 38 wherein said alcohol has about 14 or 15 carbon atoms.

46. The process of claim 38 wherein said alcohol is a mixture of alcohols having from 12 to 18 carbon atoms.

47. The process of claim 38 wherein said alcohol is a mixture of alcohols having 14 and 15 carbon atoms.

48. The process of claim 38 wherein said polyamino compound is N-aminoalkyl-substituted morpholine.

49. The process of claim 38 wherein said polyamino compound is aminopropyl morpholine.

50. The product of the process of any of claims 38–49.

* * * * *